United States Patent [19]

Bates

[11] Patent Number: 5,306,974
[45] Date of Patent: Apr. 26, 1994

[54] ELECTRICAL MOTOR WITH CHOKE COILS ON A COMMON CORE

[75] Inventor: Trevor Bates, Bedfordshire, Great Britain

[73] Assignee: Delco Chassis Overseas Corporation, Detroit, Mich.

[21] Appl. No.: 997,462

[22] Filed: Dec. 28, 1992

[30] Foreign Application Priority Data

Jul. 4, 1992 [GB] United Kingdom ............... 92142520

[51] Int. Cl.$^5$ ........................ H02K 5/10; H02K 11/00
[52] U.S. Cl. ...................................... 310/68 R; 310/51; 310/220; 361/23
[58] Field of Search ...................... 310/51, 68 R, 68 C, 310/72, 220-226; 361/23; 307/10.1

[56] References Cited

U.S. PATENT DOCUMENTS

| | | | |
|---|---|---|---|
| 2,157,430 | 5/1939 | Partz | 318/558 |
| 4,093,978 | 6/1978 | Plumer, Jr. | 361/118 |
| 4,384,223 | 5/1983 | Zelt | 310/68 R |
| 4,408,171 | 10/1983 | Akino et al. | 333/177 |
| 5,184,045 | 2/1993 | Im | 315/39.51 |
| 5,194,769 | 3/1993 | Ade et al. | 310/51 |

FOREIGN PATENT DOCUMENTS 517606  2/1940  United Kingdom .

Primary Examiner—Steven L. Stephan
Assistant Examiner—D. R. Haszko
Attorney, Agent, or Firm—Mark A. Navarre; Anthony Luke Simon

[57] ABSTRACT

An electrical motor includes a ground brush connected to ground, first and second supply brushes connected to first and second supply lines and adapted to cause the motor to rotate at first and second speeds, and an interference suppression device comprising a common core, a first coil connected in series between the first supply brush and the first supply line and a second coil connected in series between the second supply brush and the second supply line. The space required by the device in the motor casing is less than with the conventional arrangement of two individual chokes and can provide improved noise suppression due to magnetic coupling between the two coils.

8 Claims, 3 Drawing Sheets

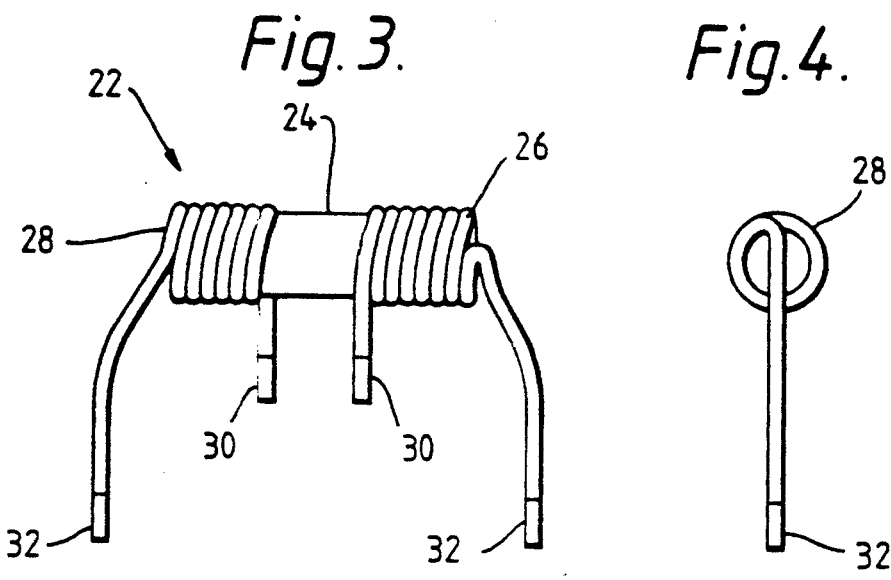
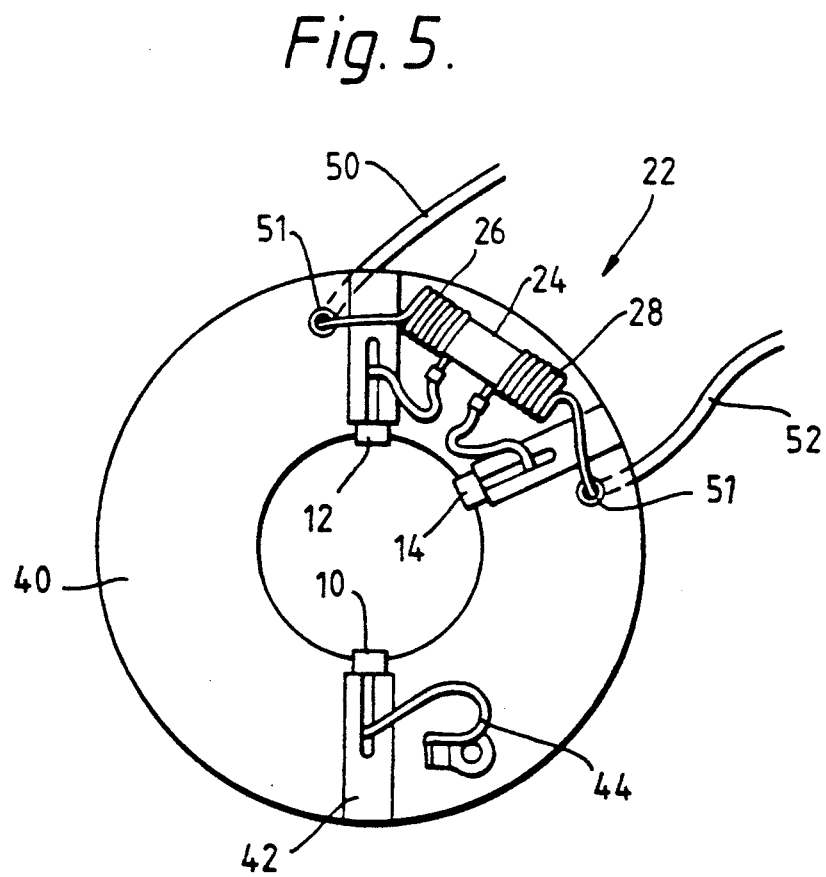

ELECTRICAL MOTOR WITH CHOKE COILS ON A COMMON CORE

The present invention relates to an electrical motor including an interference suppression choke formed of at least two coils, each connected to a respective motor supply brush, and a common core of magnetically conductive material for supporting all the coils. The present invention can be used, for example, for driving a multi-speed windscreen wiper motor for a vehicle.

BACKGROUND OF THE INVENTION

In vehicle windscreen wiper motors, it is known to connect to each supply brush of the motor a choke and a capacitor so as to suppress radio frequency interference caused during use of the windscreen wipers. In use, the choke suppresses frequencies in the FM broadcast frequency band and higher frequencies, while the capacitor suppresses the AM broadcast band and lower frequencies.

The choke is commonly formed of a length of copper wire wound into a coil around a rod-shaped core of magnetically conductive material, such as a ferrite. The number of turns of the coil is generally chosen as a compromise between the greatest number of turns which can be carried by the core, the current carrying capacity of the wire and the space available in the motor housing. In order to ensure that the core does not work itself loose from the coil, it is common to apply a coat of a suitable varnish between the coil and core so as to bond the coil to the core. Alternatively, the core can be secured in place by bending the ends of the coil around the ends of the core, although this is generally more time consuming as an additional manufacturing step is required after fitting the coil onto the core.

For a windscreen wiper motor adapted to provide two or more wiping speeds, the motor includes two or more supply brushes and, consequently, an interference suppression choke and a capacitor connected to each supply brush.

It is possible to use a single capacitor for all of the supply brushes, by coupling the capacitor directly to the supply line which connects the motor to a power supply, in such a manner that the brush selection switch used to switch from one supply brush to another is located between the capacitor and the supply brushes.

On the other hand, in order for the chokes to provide adequate noise suppression, it is necessary for them to be positioned close to the source of noise, that is close to their respective supply brush. As it is not normally possible to place the brush selection switch close to the supply brushes, due in part to space restrictions within the motor housing and to the need to have the switch close to the driver, it is not possible to reduce the number of chokes.

SUMMARY OF THE PRESENT INVENTION

The present invention seeks to provide an improved electrical motor.

According to an aspect of the present invention, there is provided an electric motor comprising a ground brush connectable to a first electrical potential; first and second supply brushes connectable to a second electrical potential and adapted to be energized selectively so as to cause the motor to rotate at first and second speeds respectively; first and second supply lines for connecting respectively the first and second supply brushes to a second electrical potential; and an interference suppression device comprising a common core of magnetically conductive material, and first and second coils disposed over the common core, the first coil being coupled in series between the first supply brush and the first supply line, and the second coil being coupled in series between the second supply brush and the second supply line.

Of course, for motors having three or more supply brushes, the interference suppression device may include three or more coils on a common core, each coil being connected to a respective brush.

A principal advantage of this arrangement is that it is only necessary to have one core for each motor, thereby saving on costs and space.

Furthermore, the use of a common core couples the coils together magnetically, which can increase the attenuation provided by each coil by up to as much as around 6 dB. Tests have shown that it is possible to reduce the number of turns of the coil from twelve turns on an individual core to nine turns on a common core, while providing the same attenuation. Moreover, the bandwidth over which the device suppresses noise is greater than in a conventional choke, and this bandwidth is readily adjustable to suit many different suppression requirements.

Preferably, the core is a substantially cylindrical rod.

In an embodiment, each coil extends over a respective end of the core. With this arrangement, the core is retained inside the first and second coils by the coils themselves. Therefore, it is not necessary to secure the core in any other way, for example with varnish, as is necessary with prior art chokes, thus reducing assembly costs and also reducing stray capacitance caused by the varnish.

Advantageously, the two coils are magnetically coupled together, which can enhance noise suppression.

Preferably, the motor includes one or more interference suppression capacitors connected to one or both of the first and second supply brushes. It has been found that when capacitors are included in order to suppress the lower, AM frequencies, the use of the interference suppression device can increase the attenuation at these frequencies. This occurs as a result of the coils reducing the effect of capacitor coupling, explained in further detail below.

Advantageously, the first electrical potential is electrical ground.

According to another aspect of the present invention, there is provided an interference suppression device comprising a common core of magnetically conductive material and having a substantially cylindrical shape, and first and second coils disposed over the common core so as to be coupled magnetically to one another.

Preferably, each coil extends over a respective end of the core.

BRIEF DESCRIPTION OF THE DRAWINGS

FIG. 3 is a side elevational view of an embodiment of an interference suppression device.

FIG. 4 is an end elevational view of the interference suppression device of FIG. 3.

FIG. 5 is a plan view of a motor brush plate including the interference suppression device of FIG. 3.

DETAILED DESCRIPTION OF THE INVENTION

Figure 1:
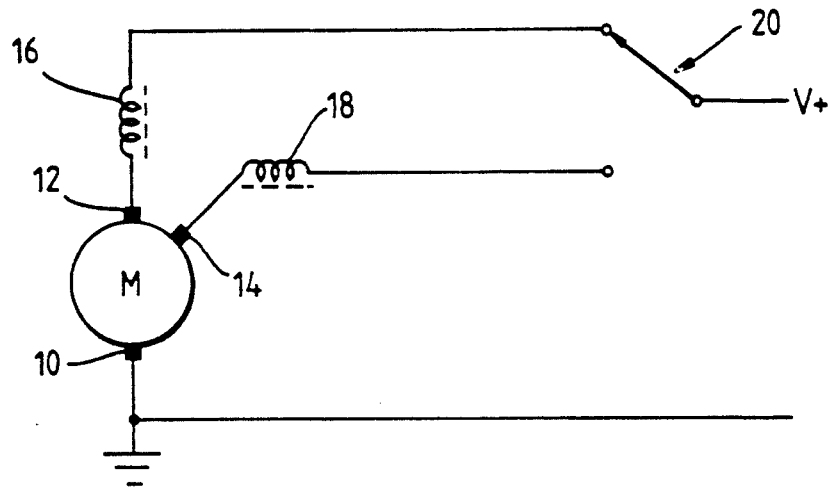
FIG. 1 is a schematic diagram of the principal components of a prior art motor and choke circuit.

Referring to FIG. 1, a prior art electric motor M comprises a ground brush 10 connected to ground or to a suitable current sinking negative power supply, such as the negative terminal of a vehicle battery. First and second supply brushes 12,14 are disposed at predetermined angular positions in the motor M relative to the ground brush 10, so as to provide respective low and high motor speeds when they are connected to a positive power source V+, typically the positive terminal of the vehicle battery. First and second interference suppression chokes 16 and 18 are provided for suppressing noise in the FM frequency band, each choke being connected in series between a respective supply brush 12,14 and the power source V+. A switch 20 is connected between the power source V+ and the supply brushes 12,14 so as to connect selectively one of the two brushes to the power source V+.

Each of the chokes of the circuit of FIG. 1 can be designed so as to resonate, either with its own capacitance or with the capacitance provided by a separate capacitor, in a manner as to provide the greatest attenuation at the center of the FM frequency band and less attenuation at the ends of the FM frequency band. However, as can be seen from the graph of FIG. 6, the bandwidth or useful operating range of the choke is limited when used in this manner, since the attenuation at the extremes of the FM frequency band can be insufficient to provide the required attenuation. The frequency band can not be increased by increasing the number of turns of the coil, since this has to be self-resonant. It can only be increased by a small extent with a larger core.

Figure 2:
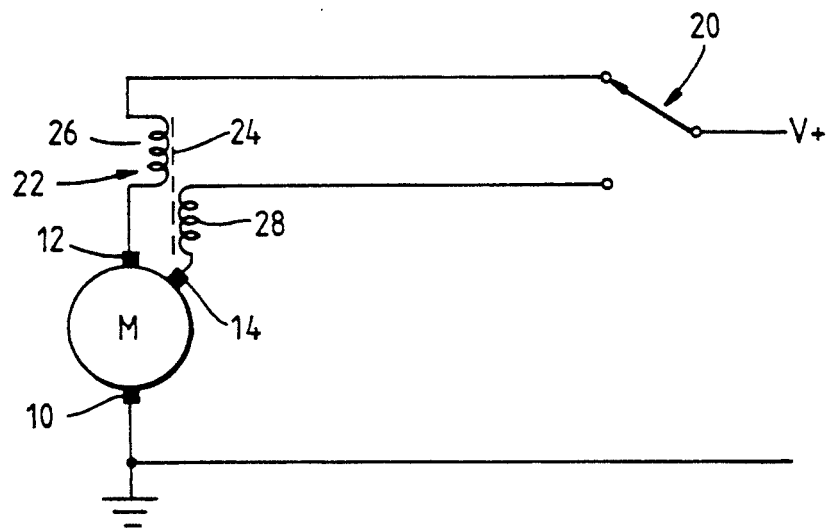
FIG. 2 is a schematic diagram of the principal components of an embodiment of circuit including a motor and interference suppression device.

Referring now to the circuit of FIG. 2, an embodiment of electric motor comprises a motor M, a ground brush 10, first and second supply brushes 12,14 and a brush selection switch 20, as with the circuit of FIG. 1. In place of the two chokes 16,18, there is provided an interference suppression device 22 formed of a common core 24 and two coils 26,28 fitted over the core 24. Each coil 26,28 includes a first end connected to a respective brush 12,14 and a second end connected to a respective terminal of the switch 20.

The coils are wound in the same direction as one another such that the flux they generate when the positive supply V+ is connected to the supply brushes 12,14 is in the same direction.

The circuit of FIG. 2 may also be provided with one or more interference suppression capacitors. In the case where only one capacitor is provided, the capacitor would have one terminal connected to the power line coupling the switch 20 to the power source V+ and a second terminal coupled to ground. Alternatively, two interference suppression capacitors may be provided, each connected to a respective supply brush 12,14 and to ground, in the conventional manner.

An example of the interference suppression device is shown in FIGS. 3 and 4, while a practical implementation of the circuit of FIG. 2 is shown in FIG. 5.

As can be seen in FIGS. 3 and 4, the interference suppression device 22 includes a substantially circular cylindrical core 24 made of a magnetically conductive material, such as a ferrite, or with iron dust. Wound around respective ends of the core 24 are first and second coils 26,28, each having an inner terminal 30 and an outer terminal 32. The coils 24,28 are typically formed from a copper wire coated in a plastics or other insulating material.

Each outer terminal 32 extends across the respective end of the core 24 so as to ensure that in use the core cannot slide out of the device 22. Thus, the two outer terminals 32 act to secure the core 24 within the device 22. It is not necessary to fix the core 24 in any other way, such as with varnish, as is necessary with the above-mentioned prior art arrangements.

The two coils 26,28 can readily be formed together by winding a length of wire around a mandrel slightly smaller in diameter than the core 24, to then be sprung onto core 24. Once the desired number of turns for the first coil have been wound, a gap is left before commencement of the winding of the second coil. The length of wire left between the two coils is then cut so as to provide the two inner terminals 30 of the coils 26,28. Prior to fitting onto the core 24, the outer end turn of each winding can be pre-shaped on the mandrel as shown in FIGS. 3 and 4, in order to hold the core in place. Modifications may be made to this method, for example, to make the inner terminals 30 of the coils 26,28 longer.

In an alternative embodiment, a single coil pre-wound on a mandrel, is sprung onto the core 24, and then its central turn is cut. This turn of the coil, and possibly also a few other adjacent turns, is unwound so as to separate the two coils 26, 28 and so as to form the inner terminals 30.

In an embodiment used for testing, the device 22 consisted of two coils of nine turns each formed from copper wire having a diameter of 0.8 mm and wound around a core of Philips 3B1 grade ferrite having a length of 25 mm and a diameter of 4 mm.

Referring to FIG. 5, the interference suppression device of FIGS. 3 and 4 is shown fitted to a brush plate 40 of an electric motor (not shown). The interference suppression device 22 is connected so as to form the electrical circuit shown in FIG. 2.

As will be apparent to the skilled person, the brush plate 40 is formed of a non-conductive material and is used to support the motor brushes and other associated circuitry. In conventional manner, each of the three brushes 10, 12, 14 is slidably received in a brush sleeve 42 fixed to the brush plate 40 and is biased towards a commutator (not shown), that is towards the central opening in the brush plate 40, by a spring fitted inside the brush sleeve 42. A flexible cable connects the ground brush 10 to a ground terminal 44, while similar cables connect the supply brushes 12,14 to the inner terminal 30 of their respective coils 26,28.

The low speed supply brush 12 is disposed substantially diametrically opposite the ground brush 10, while the high speed brush 14 is located at an intermediate point between the low speed and ground brushes, in conventional manner.

The interference suppression device 22 is located between the two supply brushes 12,14, with the inner terminals 30 of the coils 26, 28 being connected to their respective supply brush 12,14.

Each outer terminal 32 is connected through a conductive terminal pin 51 to a respective low or high speed supply line 50,52. These low and high speed supply lines 50,52 are connected to a brush selection switch (not shown) as in the circuit of FIG. 2. The conductive pins 51 also serve to provide a mechanical support for the interference suppression device 22 and, in particular, they secure the two coils 26,28 substantially in place, thereby also securing in place the core 24.

If noise suppression in the AM frequency band is also desired, two interference suppression capacitors could be provided on the brush plate 40. In this case, each capacitor would have a first terminal connected to a respective conductive pin 51 and a second terminal connected to ground. Of course, as mentioned above, a single interference suppression capacitor could be provided, connected to the supply side of the brush selection switch.

Figure 7:
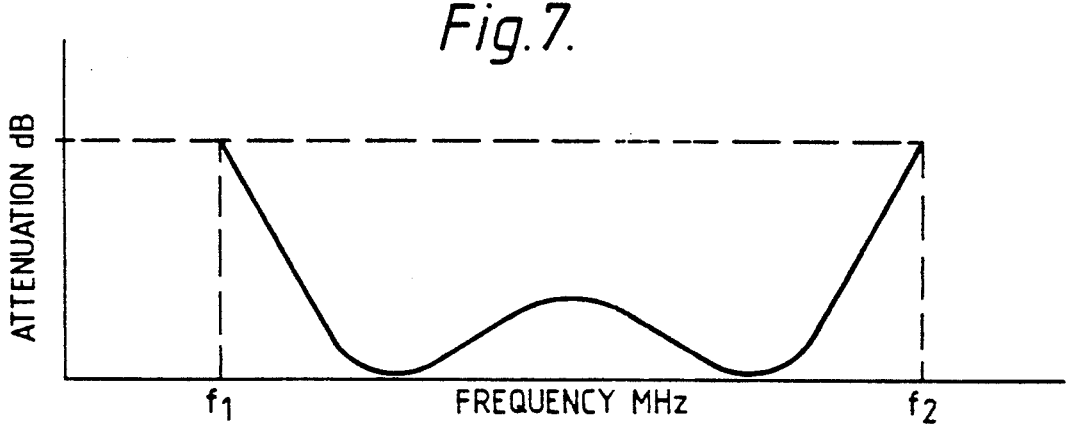
FIG. 7 is a graph of attenuation vs. frequency for an embodiment of the interference suppression device of FIG. 3.
Figure 8:
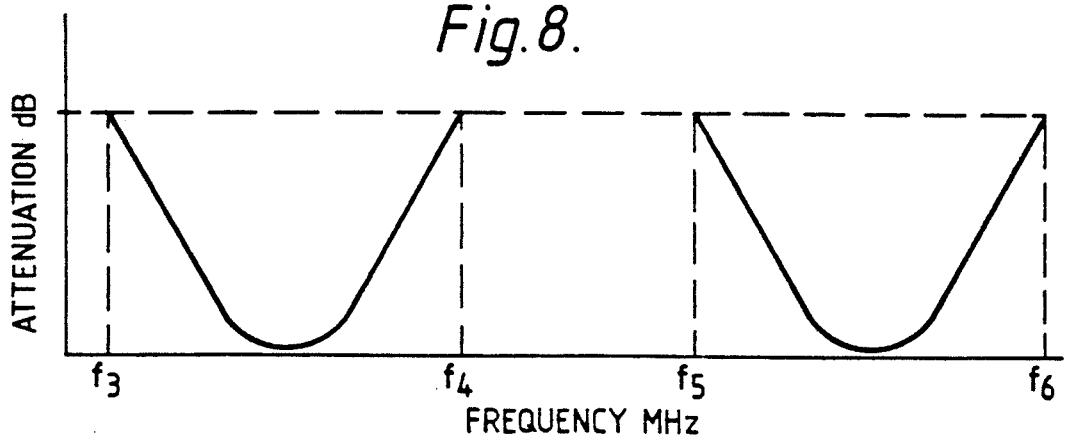
FIG. 8 is a graph of attenuation vs. frequency for a second embodiment of the interference suppression device of FIG. 3.

As can be seen in FIGS. 7 and 8, the two coils 26,28 of the interference suppression device 22 have modified suppression characteristics relative to the characteristics of a single coil and core arrangement.

These modified suppression characteristics are produced as a result of magnetic or mutual coupling between the coils 26,28 and of the self-capacitance of each coil or of the capacitance of any capacitors fitted to the circuit. This magnetic coupling is dependent upon the spacing between the two coils 26,28. When the coils 26,28 are relatively far apart from one another, there is no effective magnetic coupling and the suppression or attenuation curve takes the form of that for a single coil shown in FIG. 6.

However, as the coils 26,28 are moved closer together, magnetic coupling begins to take effect, increasing the frequency band f1'-f2' over which each coil provides noise suppression. At the same time, the attenuation curve (FIG. 7) takes a "double humped" shape, having two distinct minima, in other words two distinct frequencies at which suppression is greatest.

Once the coils are brought into close proximity to one another, each coil 26,28 provides noise suppression in two distinct frequency bands, f3-f4 and f5-f6.

Thus, the frequency characteristics of the interference suppression device 22 can be readily adjusted so as to suit the particular requirements for suppression by altering the spacing between the two coils 26,28, in practice achieved by altering the length of the core 24.

Figure 6:
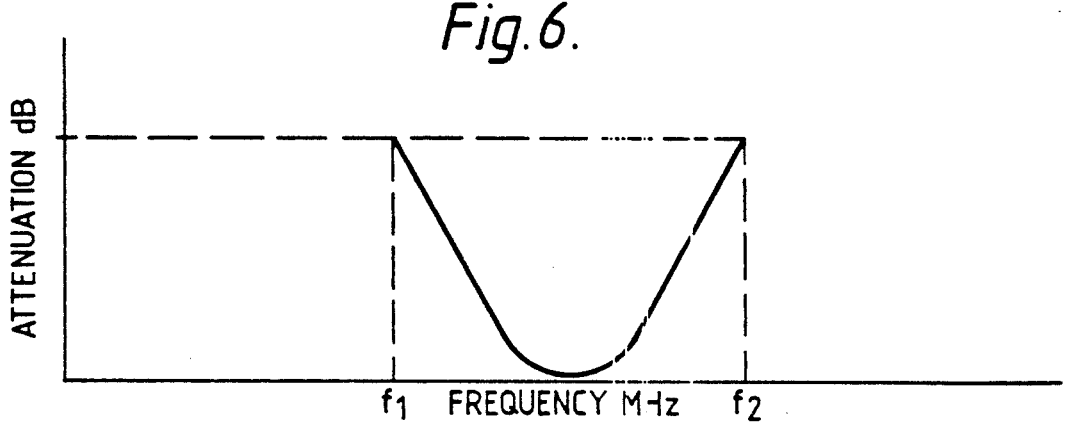
FIG. 6 is a graph of attenuation vs. frequency for a conventional self resonant choke.

Furthermore, as will be apparent from a comparison of the attenuation curves of FIGS. 7 and 8 with the curve of FIG. 6, it can be seen that the overall frequency band over which each coil provides noise suppression is greater when the coils 26,28 are magnetically coupled to one another. Tests have shown that for a typical application, the coils 26,28 can be formed of only nine turns of wire and still produce the same noise suppression as two single coils having twelve turns each and fitted on two single cores.

Figure 9:
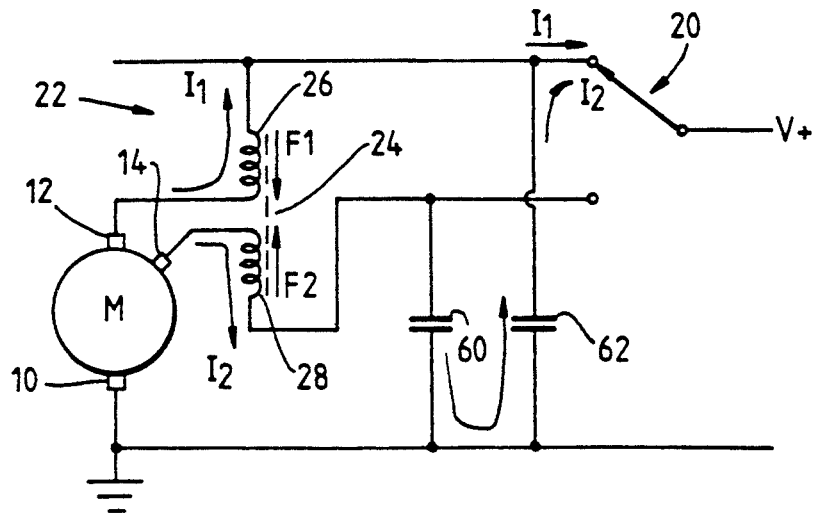
FIG. 9 is a schematic diagram of the principal components of a second embodiment of a circuit including a motor and interference suppression device.

Another advantage provided by the magnetic coupling of the two coils 26,28 is the effect produced on other components in the circuit. In the circuit shown in FIG. 9, a first interference suppression capacitor 60 is shown connected between the high speed brush supply line and ground, while a second interference suppression capacitor 62 is connected between the low speed brush supply line and ground.

Although these capacitors 60, 62 generally suppress interference in the AM frequency band adequately, they provide a coupling path between the high and low speed brushes 14,12 which in use can add a certain amount of stray noise. For example when the motor M is switched to the low speed, noise current I2 is developed in the high speed brush 14 and is then coupled from the high speed brush 14 via the capacitors 60,62 to the low speed supply line, shown by the arrows in FIG. 9.

However, when the interference suppression device 22 is fitted to the circuit, the current I2 flowing through the coil 28 produces a flux which is opposed to the flux produced by the low speed coil 26. As the flux produced by the coil 26 is dominant, this causes a reduction in the stray current I2 and therefore a reduction in stray noise generated by the high speed supply brush 14. The situation is the same when the motor is rotating at the high speed.

The embodiments of the invention in which an exclusive property or privilege is claimed are defined as follows:

1. An electric motor comprising:
   a ground brush switchably coupled to a first electrical potential;
   first and second supply brushes switchably coupled to a second electrical potential and adapted to be energized selectively so as to cause the motor to rotate at first and second speeds respectively;
   first and second supply lines for connecting respectively the first and second supply brushes to a second electrical potential; and
   an interference suppression device comprising a common core of magnetically conductive material, and first and second coils disposed over the common core, the first coil being coupled in series between the first supply brush and the first supply line, and the second coil being coupled in series between the second supply brush and the second supply line.

2. An electric motor according to claim 1, wherein the core is a substantially cylindrical rod.

3. An electric motor according to claim 2, wherein each coil extends over a respective end of the core.

4. An electric motor according to claim 1, wherein the first and second coils are magnetically coupled together.

5. An electric motor according to claim 1, including an interference suppression capacitor connected to one of the first and second supply brushes.

6. An electric motor according to claim 1, wherein the first electrical potential is electrical ground.

7. An electric motor according to claim 1, wherein the electric motor is a vehicle windscreen wiper motor.

8. An electric motor comprising:
   a ground brush switchably coupled to a first electrical potential;
   first and second supply brushes switchably coupled to a second electrical potential and adapted to be energized selectively so as to cause the motor to rotate at first and second speeds respectively;
   a brush plate retaining the first and second supply brushes and the ground brush and including first and second conductive terminal pins;
   first and second supply lines for connecting respectively the first and second supply brushes to a second electrical potential; and an interference suppression device comprising a common core of magnetically conductive material, and first and second coils disposed over the common core, the first coil being coupled in series between the first supply brush and the first supply line, and the second coil being coupled in series between the second supply brush and the second supply line, wherein the first supply brush is located diametrically opposite the ground brush and the second supply brush is located at an intermediate point between the first supply brush and the ground brush, wherein the first and second conductive terminal pins support the interference suppression device and locate the interference suppression device proximate to and between the first and second supply brushes, and wherein the spacing between the two coils is set to frequency suppression characteristics of the interference suppression device.

* * * * *